United States Patent
Juarez Becerril et al.

(10) Patent No.: US 9,964,044 B2
(45) Date of Patent: May 8, 2018

(54) AUXILIARY POWER UNIT STARTING SYSTEM FOR AN AIRCRAFT

(71) Applicant: AIRBUS OPERATIONS, S.L., Getafe (ES)

(72) Inventors: Alberto Juarez Becerril, Getafe (ES); Mario Marcos Garcia, Getafe (ES)

(73) Assignee: Airbus Operations S.L., Madrid (ES)

( * ) Notice: Subject to any disclaimer, the term of this patent is extended or adjusted under 35 U.S.C. 154(b) by 0 days. days.

(21) Appl. No.: 15/156,619

(22) Filed: May 17, 2016

(65) Prior Publication Data
US 2016/0341128 A1 Nov. 24, 2016

(30) Foreign Application Priority Data

May 18, 2015 (EP) ..................................... 15382255

(51) Int. Cl.
| | |
|---|---|
| F02N 11/04 | (2006.01) |
| H02P 9/04 | (2006.01) |
| F02C 7/26 | (2006.01) |
| F01D 19/00 | (2006.01) |
| F02C 7/268 | (2006.01) |
| B64D 41/00 | (2006.01) |
| F02N 11/08 | (2006.01) |
| B64D 31/00 | (2006.01) |
| B64F 1/34 | (2006.01) |
| G05D 1/00 | (2006.01) |

(52) U.S. Cl.
CPC ............... *F02C 7/26* (2013.01); *B64D 41/00* (2013.01); *F01D 19/00* (2013.01); *F02C 7/268* (2013.01); *F02N 11/0803* (2013.01); *F02N 11/087* (2013.01); *F02N 2011/0874* (2013.01); *F05D 2220/50* (2013.01); *F05D 2220/76* (2013.01); *Y02T 50/671* (2013.01)

(58) Field of Classification Search
USPC ..................... 701/1, 29; 244/53 A; 290/36 R
See application file for complete search history.

(56) References Cited

U.S. PATENT DOCUMENTS

| 5,899,411 A | 5/1999 | Latos et al. | |
|---|---|---|---|
| 6,018,233 A * | 1/2000 | Glennon | ................. F02N 11/04 |
| | | | 290/36 R |

(Continued)

FOREIGN PATENT DOCUMENTS

EP 2801719 11/2014

OTHER PUBLICATIONS

European Search Report, dated Nov. 6, 2015, priority document.

*Primary Examiner* — Pedro J Cuevas
(74) *Attorney, Agent, or Firm* — Greer, Burns & Crain Ltd.

(57) ABSTRACT

An auxiliary power unit (APU) starting system for an aircraft comprises an APU comprising a starter motor and a generator, a DC power network, an AC power network, an electric connection line, and a control unit for controlling the APU starting and generating phase. The APU starting system additionally comprises switches for alternatively connecting through the electric connection line the DC power network with the APU starter motor, and the AC power network with the APU generator, wherein the control unit is further configured to operate the switches to connect the DC power network with the APU starter motor during the APU starting phase, and the AC power network with the APU generator during the APU starting phase.

14 Claims, 3 Drawing Sheets

(56) References Cited

U.S. PATENT DOCUMENTS

| | | | | |
|---|---|---|---|---|
| 6,882,917 B2* | 4/2005 | Pillar | A62C 27/00 | 180/65.27 |
| 6,885,920 B2* | 4/2005 | Yakes | A62C 27/00 | 180/65.1 |
| 6,993,421 B2* | 1/2006 | Pillar | A62C 27/00 | 701/29.4 |
| 7,184,866 B2* | 2/2007 | Squires | A62C 27/00 | 340/426.15 |
| 7,392,122 B2* | 6/2008 | Pillar | A62C 27/00 | 701/22 |
| 7,756,621 B2* | 7/2010 | Pillar | A62C 27/00 | 701/22 |
| 7,906,866 B2* | 3/2011 | Anghel | F02N 11/04 | 307/10.1 |
| 7,939,962 B2* | 5/2011 | Foch | H02J 1/10 | 307/19 |
| 8,657,227 B1* | 2/2014 | Bayliss | H02J 4/00 | 244/134 D |
| 8,950,703 B2* | 2/2015 | Bayliss | H02J 4/00 | 244/134 D |
| 9,592,907 B2* | 3/2017 | Vieillard | B64C 25/405 | |
| 9,819,179 B2* | 11/2017 | Nakagawa | H02J 1/08 | |
| 9,827,978 B2* | 11/2017 | McCullough | B60W 20/30 | |
| 2003/0158635 A1* | 8/2003 | Pillar | A62C 27/00 | 701/1 |
| 2003/0158638 A1* | 8/2003 | Yakes | A62C 27/00 | 701/22 |
| 2003/0158640 A1* | 8/2003 | Pillar | A62C 27/00 | 701/29.4 |
| 2004/0002794 A1* | 1/2004 | Pillar | A62C 27/00 | 701/1 |
| 2004/0024502 A1* | 2/2004 | Squires | A62C 27/00 | 701/29.3 |
| 2004/0027077 A1 | 2/2004 | Xu et al. | | |
| 2005/0234622 A1* | 10/2005 | Pillar | A62C 27/00 | 701/41 |
| 2006/0042267 A1 | 3/2006 | Thompson | | |
| 2006/0052922 A1* | 3/2006 | Koenig | H01M 16/006 | 701/36 |
| 2006/0080013 A1* | 4/2006 | Koenig | H01M 16/006 | 701/36 |
| 2008/0114513 A1* | 5/2008 | Pillar | A62C 27/00 | 701/41 |
| 2008/0215700 A1* | 9/2008 | Pillar | A62C 27/00 | 709/212 |
| 2008/0221741 A1* | 9/2008 | Pillar | A62C 27/00 | 701/1 |
| 2012/0232728 A1* | 9/2012 | Karimi | H02J 3/38 | 701/22 |
| 2012/0318914 A1* | 12/2012 | Rajashekara | B64D 41/00 | 244/58 |
| 2014/0020401 A1 | 1/2014 | Taneja et al. | | |
| 2014/0333127 A1 | 11/2014 | Edwards | | |
| 2017/0326964 A1* | 11/2017 | Lahr | B60K 6/36 | |
| 2017/0326965 A1* | 11/2017 | Lahr | B60K 6/40 | |

* cited by examiner

AUXILIARY POWER UNIT STARTING SYSTEM FOR AN AIRCRAFT

CROSS-REFERENCES TO RELATED APPLICATIONS

This application claims the benefit of the European patent application No. 15382255.6 filed on May 18, 2015, the entire disclosures of which are incorporated herein by way of reference.

BACKGROUND OF THE INVENTION

The present invention refers to a new auxiliary power unit starting system for an aircraft; in particular, for those aircraft whose auxiliary power unit starting architecture uses a dedicated link between power source and the auxiliary power unit starter motor.

The auxiliary power unit (APU) is a gas turbine engine that supplies electrical and pneumatic power to the aircraft systems as an auxiliary or secondary source of power. The APU allows the aircraft to be autonomous of external electrical and pneumatic power sources on the ground and in-flight. The APU is managed by the Electronic Control Box (ECB), a full-authority engine controller that monitors and provides full self-protection. The APU turbomachinery is mounted in a dedicated fire compartment in the tail cone of the aircraft, the APU compartment, while the APU controller is traditionally installed in the pressurized fuselage.

The APU provides pneumatic power to permit main engine start and compressed air for cabin comfort through the Environmental Control System (ECS). Electrical and pneumatic power can be provided to the aircraft separately or in combination. Electrical power has priority over pneumatic power.

The APU turbomachinery is traditionally started by means of a starter motor, which is mounted in the gearbox. The starter motor can be a DC starter motor or an AC starter motor.

The DC starter motor 3 is normally supplied by two different DC electrical power sources in parallel: a battery and a transformer rectifier unit (TRU). These two DC electrical power sources can be either shared between the APU 2 and any other aircraft system (FIG. 1), or dedicated to the APU starting system (FIG. 2). FIG. 1 shows a shared DC power network 4 that comprises a battery 18 and a TRU 19. FIG. 2 shows two DC power networks 4a, 4b that each comprise a battery 18a, 18b and a TRU 19a, 19b respectively. The DC power network 4b is dedicated to the APU starting system, while the DC power network 4a is used for any other aircraft system.

In addition to the DC power network 4, the nose fuselage power center traditionally comprises an AC power network 6 supplied by an AC power source 24. The AC power network 6 feeds the transformer rectifier unit 18 via an AC bus 21.

The current traditional architecture of the APU DC starting system shown in FIG. 1 comprises a dedicated DC link 9 between the electrical distribution center placed at the nose section 25 and the APU DC starter motor 3 placed at the APU compartment 26. Specifically, the dedicated DC link 9 connects the DC power network 4 with the DC starter motor 3. For that, the DC link 9 is connected to a DC bus 22 fed by both the transformer rectifier unit 18 and the battery 19.

The starting torque and corresponding electrical power required to start the APU are unavoidably very high. For some aircraft models, it is not possible to use the batteries 18a installed in the front part of the aircraft 15, due to the excessive heat dissipation and corresponding voltage drop in the electrical feeders connecting the batteries to the DC starter motor 3. Thus, as shown in FIG. 2, the battery 18b exclusively used to supply the APU DC starter motor 3 must be installed at the rear part of the aircraft 15, as close as possible to the APU compartment 26. For that, the DC power network 4a of the front part of the aircraft 15 is duplicated at the rear part of the aircraft 15.

The alternative APU DC starting architecture of FIG. 2 comprises a dedicated AC link between the electrical distribution center of the nose section and the duplicated DC power network 4b. Specifically, the dedicated AC link 27a connects the AC power source 24 by means of an AC bus 21, with the transformer rectifier unit 18b of the duplicated DC power network 4b. Additionally, the DC bus bar 22b of the duplicated DC power network 4b is connected to the APU DC starter motor 3.

Let it be noted how both traditional APU starting systems, respectively shown in FIGS. 1 and 2, imply a dedicated link (9, 27a and 27b) between the electrical distribution center at the nose section and the APU starter motor through the entire length of the aircraft 15.

It would therefore be desirable to provide technical means that simplify conventional APU starting systems, at the same time that reduce the associated weight while maximizing commonality and reuse of components from the electrical architecture on existing aircraft.

Additionally, it would be desirable to reduce the cost associated to traditional APU starting systems.

SUMMARY OF THE INVENTION

The present invention overcomes the above mentioned drawbacks by providing an auxiliary power unit starting system, which simplifies conventional APU starting systems, at the same time that achieves a weight and cost reduction.

An object of the invention is to provide an auxiliary power unit starting system that minimizes the weight of conventional auxiliary power unit starting systems, at the same time that reduces associated costs, such as installation, recurrent and direct maintenance costs.

Another object of the present invention is to provide an auxiliary power unit starting system that occupies less space than conventional auxiliary power unit starting systems, so that allows saving space when installed in the aircraft.

The invention refers to an auxiliary power unit starting system for an aircraft that comprises an auxiliary power unit, a DC power network, an AC power network, an electric connection line, and a control unit. The auxiliary power unit comprises a starter motor for starting the auxiliary power unit, and a generator for providing AC power to an aircraft. The DC power network is suitable for providing power to the starter motor. The AC power network is suitable for receiving power from the generator. The electric connection line is connectable between the generator and the AC power network for providing the generated power to the AC power network. The control unit is configured to control the auxiliary power unit during an auxiliary power unit starting phase and an auxiliary power unit generating phase. According to the invention, the auxiliary power unit starting system additionally comprises switches for alternatively connecting through the electric connection line the DC power network with the starter motor, and the AC power network with the generator, wherein the control unit is configured to operate the switches to connect the DC power network with the starter motor during the auxiliary power unit starting phase, and the AC power network with the generator during the auxiliary power unit generating phase.

Providing switches to establish alternative connections for the electric connection line, and configuring the control unit so as to operate these switches to connect the DC power network with the starter motor during the auxiliary power unit starting phase, and the AC power network with the generator during the auxiliary power unit generating phase, allows the invention only requiring to extend one electric connection line. This unique electric connection line is used for both functionalities: providing power to the APU starter motor for starting the APU, and supplying the APU generated power to the AC power network once the turbomachinery has been started. The use of only one electric connection line between the electrical distribution center at the nose section and the APU starter motor achieves to simplify the APU starting system.

Further, the removal of a dedicated link between the electrical distribution center and the APU starter motor, together with the associated installation components of said dedicated link, allows reducing installation, recurrent and direct maintenance costs.

Additionally, the invention achieves a significant weight reduction by dispensing with the dedicated link between the electrical distribution center and the APU starter motor, and using only one electric connection line for the both purposes, starting the APU and receiving the APU generated power.

Moreover, providing an APU starting system that only requires one electric connection line, the invention enables saving space, thereby offering extra room for either harness routing for any other new or existing aircraft system, or the placement of any new or existing aircraft equipment.

BRIEF DESCRIPTION OF THE DRAWINGS

For a better comprehension of the invention, the following drawings are provided for illustrative and non-limiting purposes, wherein.

DETAILED DESCRIPTION OF THE PREFERRED EMBODIMENTS

Figure 3:
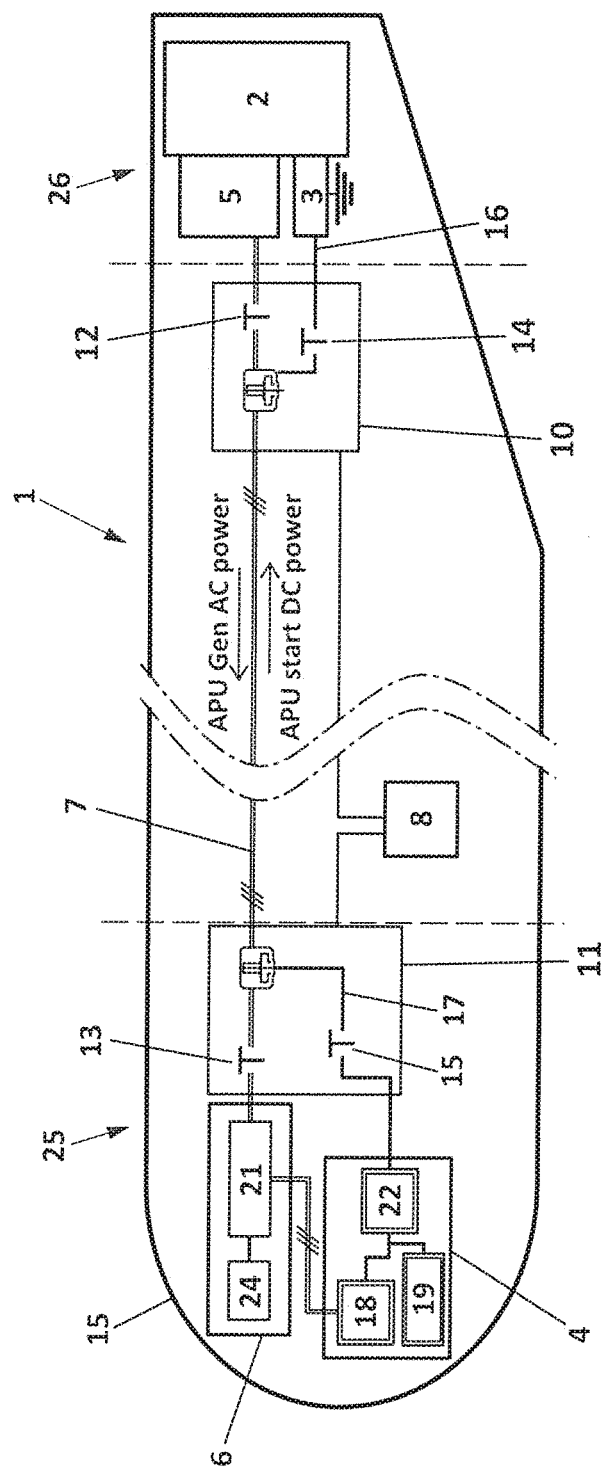
FIG. 3 shows a schematic lateral view of an APU DC starting system according to an embodiment of the present invention.

FIG. 3 shows a schematic view of an auxiliary power unit starting system 1 for an aircraft 15 according to the invention. As conventional, the auxiliary power unit starting system 1 of FIG. 3 comprises an auxiliary power unit 2, comprising a DC starter motor 3 and a generator 5, and a power circuit comprising a DC power network 4 and an AC power network 6. Also, as conventional, the auxiliary power unit starting system 1 comprises an electric connection line 7 for connecting the generator 5 with the AC power network 6 in order to provide the auxiliary power unit generated power to the loads of the AC power network 6.

According to the invention, the auxiliary power unit starting system 1 additionally comprises switches 10, 11 for connecting the DC power network 4 with the starter motor 3 during the auxiliary power unit starting phase, and the AC power network 6 with the generator 5 during the auxiliary power unit generating phase. For that, the system further comprises a control unit 8 configured to operate the switches 10, 11 to provide such connections.

The invention does not modify the APU performance since connections between the APU and the power circuit occur at different times of the APU operation. This way, as traditional, the auxiliary power unit starting system 1 will provide electric connection between the DC power network 4 and the starter motor 3, and between the AC power network 6 and the generator 5.

Providing these connections alternatively by means of the electric connection line 7, the invention allows for removal of the traditionally required dedicated link between the DC power network 4 and the starter motor 3. This way, the electric connection line 7 is used for both providing power to start the APU 2, and providing the generated power to the AC power network 6.

Figure 1:
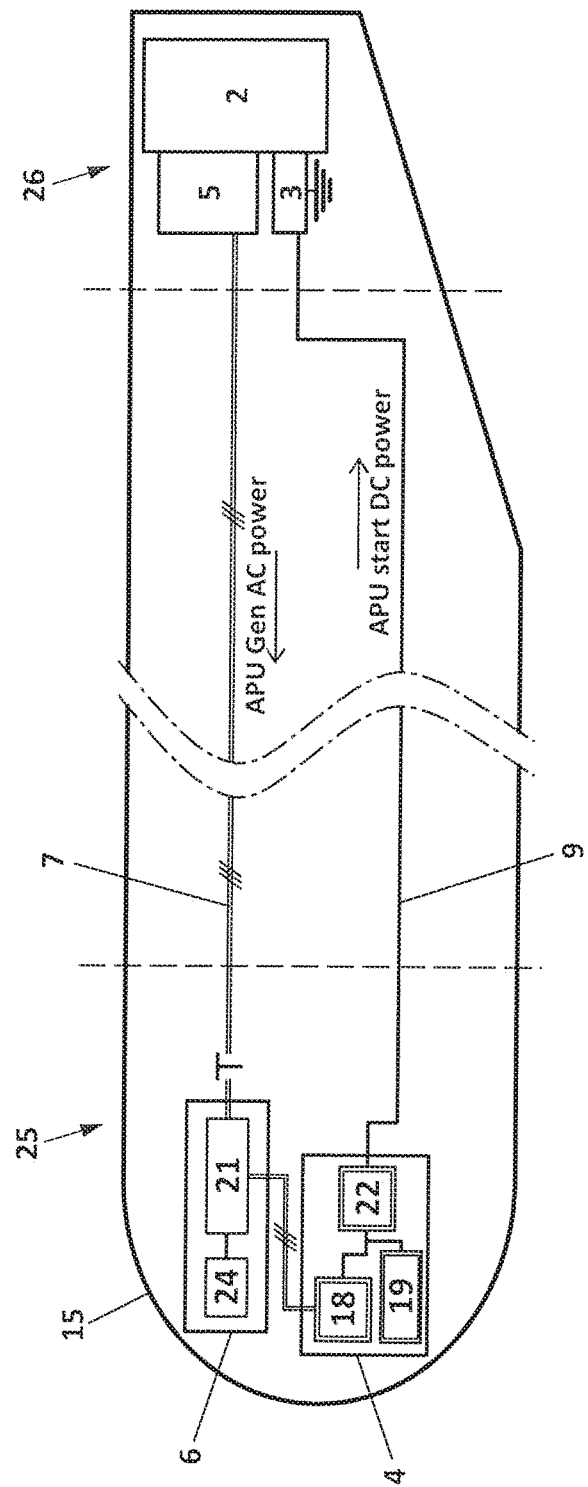
FIG. 1 shows a schematic lateral view of a conventional APU DC starting system in an aircraft, in which the DC electrical power source is shared between the APU and the rest of the aircraft electrical network.

With respect to the conventional APU DC starting system (FIG. 1), the auxiliary power unit starting system 1 of FIG. 3 allows removing the DC feeders conventionally used by a dedicated link between the DC power network 4 and the DC starter motor 3. This removal presents the following advantages:

significant weight saving due to the DC feeders removal,
removal of significant part of the APU DC starting route and associated installation components, such as clamps and brackets,
reduction of installation costs due to the removal of several sections of the APU DC starting route and associated installation components,
direct maintenance cost saving associated to the removal of harnesses and installation components,
obtaining of extra space for additional harness routing from any other new or existing aircraft system.

Figure 2:
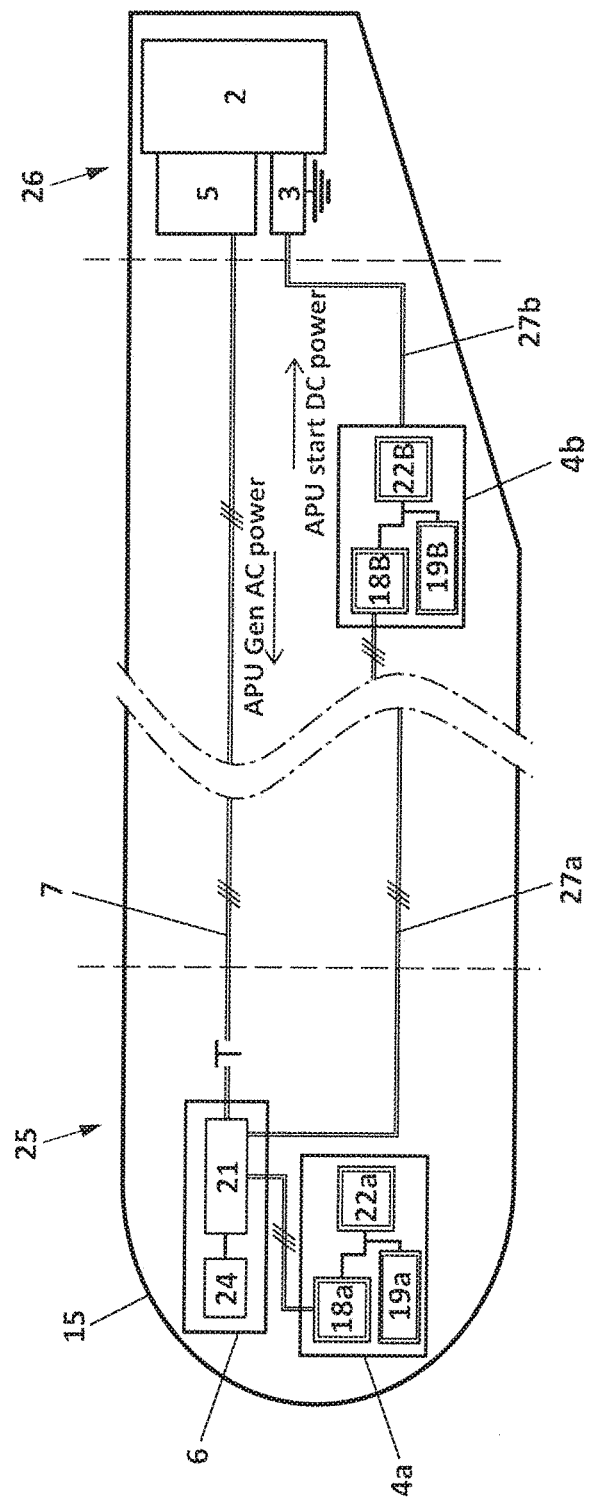
FIG. 2 shows a schematic lateral view of another conventional APU DC starting system in an aircraft, in which the DC electrical power source is dedicated to the APU starting system.

With respect to the other conventional APU DC starting system (FIG. 2), the auxiliary power unit starting system 1 of FIG. 3 allows removing the duplicated DC power source of the rear section of the aircraft. This removal presents the following advantages:

very significant weight saving (dedicated rear power center, TRU, battery, wiring and installation components),
significant reduction of recurrent costs,
reduction of scheduled maintenance tasks due to APU battery removal,
improvement of Operational Interruption (OI) rate due to removal of both APU dedicated TRU and battery,
obtaining of extra space for any other new or existing equipment of the aircraft.

While presenting all of those previous advantages, the invention further allows maximizing commonality and reuse of components from the electrical architecture on existing aircraft.

As shown in FIG. 3, and according to a preferred embodiment, the switches 10, 11 comprise the first switch 10 for selectively connecting the electric connection line 7 with the starter motor 3 or with the generator 5, and wherein the control unit 8 is configured to operate the first switch 10 to connect the starter motor 3 during the auxiliary power unit starting phase, and the generator 5 during the auxiliary power unit generating phase.

Preferably, the auxiliary power unit starting system 1 comprises a first additional line 16 connecting the starter motor 3 with the electric connection line 7, and wherein the first switch 10 comprises a first contactor 12 provided in the electric connection line 7 and a second contactor 14 provided in the first additional line 16, and wherein the control unit 8 is configured to operate the first and second contactors 12, 14 to selectively connect the electric connection line 7 with the generator 5 or with the starter motor 3.

As shown in FIG. 3, and according to another preferred embodiment, the switches 10, 11 further comprise the second switch 11 for selectively connecting the electric connection line 7 with the AC power network 6 or with the DC power network 4, and wherein the control unit 8 is configured to operate the second switch 11 to connect the DC power network 4 during the auxiliary power unit starting phase and the AC power network 6 during the auxiliary power unit generating phase.

Preferably, the auxiliary power unit starting system 1 comprises a second additional line 17 connecting the DC power network 4 to the electric connection line 7, and wherein the second switch 11 comprises a third contactor 13 provided in the electric connection line 7 and a fourth contactor 15 provided in the second additional line 17, and wherein the control unit 8 is configured to operate the third and fourth contactors 13, 15 to selectively connect the electric connection line 7 with the AC power network 6 and the DC power network 4.

During the APU starting phase, the control unit 8 commands both the fourth contactor 15 and the second contactor 14 to move to the close position. At the same time, the third contactor 13 and the first contactor 12 are kept in the open position in order to isolate the AC power network 6 from the DC power network 4, and the APU generator 5 from the APU starter motor 3.

Once the APU turbomachinery has reached the self-sustained rotational speed (around 50% nominal speed), the APU starter motor 3 is disengaged, and therefore the control unit 8 commands both fourth contactor 15 and second contactor 14 to open.

During the APU generating phase, the control unit 8 commands both the third contactor 13 and the first contactor 12 to move to the close position. At the same time, the fourth contactor 15 and the second contactor 14 are kept in the open position.

As shown in FIG. 3, and according to a preferred embodiment, the DC power network 4 comprises a battery 19 for supplying DC power to the starter motor 3. Additionally, the DC power network 4 also comprises a transformer rectifier unit 18 connected to the AC power network 6 for alternatively supplying DC power from an AC power source 24 to the starter motor 3. These two power sources (the battery 19 and the transformer rectifier unit 18) can be used separately or connected in parallel depending on the given electrical configuration of the aircraft during the APU starting phase.

According to a preferred embodiment, the auxiliary power unit generator 5 and the electric connection line 7 are connected by means of one or several phases during the auxiliary power unit generating phase. The electric connection line 7 may comprise one or several wires per phase of the generator 5. During the APU starting phase, depending on the voltage drop between the nose fuselage power center and the starter motor 3, the proposed solution (FIG. 3) could make use of any combination and number of wires from the electric connection line 7 that is considered most convenient so as to minimize the losses and the voltage drop at the APU starter input.

The auxiliary power unit starting system 1 is further configured to detect a wire failure or damage. This monitoring prevents an inadvertent overcurrent on the remaining AC feeder wires from the electric connection line 7 during the APU starting phase.

According to another preferred embodiment, the switches 10, 11 comprise contactors 12, 13, 14, 15 configured as interlocking devices to prevent simultaneous connection. If required for redundancy reasons, the switches 10, 11 may comprise several contactors in series on the electric connection line 7, the first additional line 16, and the second additional line 17.

Interlocking devices mechanically prevent one of the contactors from closing while the other is closed. In addition, the control unit 8 will monitor the status of the contactors in order to appropriately command them to the fail-safe position in case of failure, providing a back-up protection. That will avoid interconnection between the AC and DC networks, and the APU generator from the APU starter motor.

Finally, according to another aspect of the present invention, the invention further comprises an aircraft comprising the auxiliary power unit starting system as described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An auxiliary power unit starting system for an aircraft comprising:
   an auxiliary power unit comprising a DC starter motor to start the auxiliary power unit and a generator to provide AC power to the aircraft,
   a DC power network to provide power to the DC starter motor,
   an AC power network adapted to receive power from the generator,
   an electric connection line connectable between the generator and the AC power network to supply the generated power to the AC power network,
   a control unit configured to control the auxiliary power unit during an auxiliary power unit starting phase, and an auxiliary power unit generating phase, the auxiliary power unit starting system further comprising:
   switches to alternatively connect, through the electric connection line, the DC power network with the DC starter motor during the APU starting phase, and the generator with the AC power network, during the auxiliary power unit generating phase,
   wherein the control unit is configured to operate the switches to connect the DC power network with the DC starter motor by means of the electric connection line during the auxiliary power unit starting phase, and the AC power network with the generator by means of same electric connection line, during the auxiliary power unit generating phase.

2. The auxiliary power unit starting system according to claim 1, wherein the switch comprises a first switch for selectively connecting the electric connection line with the DC starter motor or with the generator, and wherein the control unit is additionally configured to operate the first switch to connect the DC starter motor during the auxiliary power unit starting phase, and the generator during the auxiliary power unit generating phase.

3. The auxiliary power unit starting system according to claim 2, further comprising a first additional line connecting the DC starter motor with the electric connection line, wherein the first switch comprises a first contactor provided in the electric connection line and a second contactor provided in the first additional line, and wherein the control unit is configured to operate the first and second contactors to selectively connect the electric connection line with the generator or with the DC starter motor.

4. The auxiliary power unit starting system according to claim 1, wherein the switch further comprises a second switch for selectively connecting the electric connection line with the AC power network or with the DC power network, and wherein the control unit is additionally configured to operate the second switch to connect the DC power network during the auxiliary power unit starting phase, and the AC power network during the auxiliary power unit generating phase.

5. The auxiliary power unit starting system according to claim 4, further comprising a second additional line connecting the DC power network to the electric connection line, wherein the second switch comprises a third contactor provided in the electric connection line and a fourth contactor provided in the second additional line, and wherein the control unit is configured to operate the third and fourth contactors to selectively connect the electric connection line with the AC power network or the DC power network.

6. The auxiliary power unit starting system according to claim 1, wherein the DC power network comprises a battery configured to start the auxiliary power unit DC starter motor.

7. The auxiliary power unit starting system according to claim 1, wherein the DC power network comprises a transformer rectifier unit connected to the AC power network to provide DC power.

8. The auxiliary power unit starting system according to claim 1, wherein the auxiliary power unit generator and the electric connection line are connected via one or several phases during the auxiliary power unit generating phase.

9. The auxiliary power unit starting system according to claim 1, wherein the electric connection line comprises one or several wires per phase of the generator.

10. The auxiliary power unit starting system according to claim 9, wherein the DC power network is connected to the DC starter motor by at least one wire of the electric connection line during the auxiliary power unit starting phase.

11. The auxiliary power unit starting system according to claim 9, wherein the control unit is configured to detect a wire failure or damage to prevent overcurrent during APU starting phase.

12. The auxiliary power unit starting system according to claim 1, wherein the switch comprises contactors configured as interlocking devices to prevent simultaneous connection.

13. The auxiliary power unit starting system according to claim 1,
wherein the switch comprises a first switch for selectively connecting the electric connection line with the DC starter motor or with the generator,
wherein the control unit is additionally configured to operate the first switch to connect the DC starter motor during the auxiliary power unit starting phase, and the generator during the auxiliary power unit generating phase,
further comprising a first additional line connecting the DC starter motor with the electric connection line, wherein the first switch comprises a first contactor provided in the electric connection line and a second contactor provided in the first additional line, and wherein the control unit is configured to operate the first and second contactors to selectively connect the electric connection line with the generator or with the DC starter motor,
wherein the switch further comprises a second switch for selectively connecting the electric connection line with the AC power network or with the DC power network, and wherein the control unit is additionally configured to operate the second switch to connect the DC power network during the auxiliary power unit starting phase, and the AC power network during the auxiliary power unit generating phase,
further comprising a second additional line connecting the DC power network to the electric connection line, wherein the second switch comprises a third contactor provided in the electric connection line and a fourth contactor provided in the second additional line, and wherein the control unit is configured to operate the third and fourth contactors to selectively connect the electric connection line with the AC power network or the DC power network,
wherein the switch comprises contactors configured as interlocking devices to prevent simultaneous connection, and
wherein the switch comprises several contactors in series on the electric connection line, the first additional line, and the second additional line.

14. An aircraft comprising an auxiliary power unit starting system, comprising:
an auxiliary power unit comprising a DC starter motor to start the auxiliary power unit and a generator to provide AC power to the aircraft,
a DC power network to provide power to the DC starter motor,
an AC power network adapted to receive power from the generator,
an electric connection line connectable between the generator and the AC power network to provide the generated power to the AC power network,
a control unit configured to control the auxiliary power unit during an auxiliary power unit starting phase and an auxiliary power unit generating phase, the auxiliary power unit starting system further comprising:
switches to alternatively connect, through the electric connection line, the DC power network with the DC starter motor during the APU starting phase, and the generator with the AC power network, during the auxiliary power unit generating phase,
wherein the control unit is configured to operate the switches to connect the DC power network with the DC starter motor by means of the electric connection line during the auxiliary power unit starting phase, and the AC power network with the generator by means of the same electric connection line during the auxiliary power unit generating phase.

* * * * *